United States Patent

[11] 3,630,437

| [72] | Inventor | James R. Swanson |
| | | Glenview, Ill. |
| [21] | Appl. No. | 6,985 |
| [22] | Filed | Jan. 30, 1970 |
| [45] | Patented | Dec. 28, 1971 |
| [73] | Assignee | Powers Regulator Company |
| | | Skokie, Ill. |

[54] METHOD AND APPARATUS FOR REMOTELY CALIBRATING SENSOR INSTRUMENTS
3 Claims, 2 Drawing Figs.

| [52] | U.S. Cl. | 236/51, 236/74 |
| [51] | Int. Cl. | G05d 23/19 |
| [50] | Field of Search | 236/46, 91 |

[56] References Cited
UNITED STATES PATENTS

| 1,795,753 | 3/1931 | Bonn | 236/46 X |
| 2,134,940 | 11/1938 | Grant | 236/91 |
| 2,250,899 | 7/1941 | Young | 236/46 |
| 2,420,043 | 5/1947 | Johnson | 236/9 |
| 2,689,932 | 9/1954 | Hornfeck | 236/91 UX |

Primary Examiner—Edward J. Michael
Attorney—Hume, Clement, Hume & Lee

ABSTRACT: There is disclosed a method and an apparatus for carrying out the method for calibrating the set-point of a control system comprising a sensor for providing a signal indicative of a variable condition, and a control operable in response to departure of the variable condition from a set-point, the method comprising the steps of: combining a calibrating signal with the sensor signal; adjusting the calibrating signal so that the total or resultant signal at the output to the sensor is equal to a value corresponding to the desired set-point value; adjusting the set-point setting until the control means provides an output signal indicative of equivalence of the set-point and the resultant signal and removing the calibrating signal.

3,630,437

METHOD AND APPARATUS FOR REMOTELY CALIBRATING SENSOR INSTRUMENTS

BACKGROUND OF THE INVENTION

The present invention relates to instrumentation systems, and more particularly to a novel method and apparatus for calibrating an instrumentation system.

Those concerned with the development of instrumentation systems have long recognized the need for a method to remotely calibrate an instrumentation system. The present invention fulfills this need.

One instrumentation system well known in the art is referred to as a general transducer instrumentation system. This type of system may deal with either or both of two general classes of transducer output information. The first general class is the continuous-valued output signal which represents the magnitude or intensity of some parameter such as temperature. The second general class of output data is the binary or "ON-OFF" type such as a switch closure.

By way of example, a thermostat unit in the home may provide both of the classes of output information referred to above. The first class is represented by the thermostat's ability to measure and visually indicate the actual temperature of the room. The second class is represented by the thermostat's furnace control capability. The thermostat's furnace switch has two control states, one representing a condition of adequate temperature and the second representing the condition of excessively low temperature. The thermostat's furnace switch is used for control purposes by turning on the heating plant in response to the excessively low-temperature condition. In general, the set-point of the thermostat switch is variable, and the response action can be set to take place according to the position of a setable indicator, moving against a calibrated scale.

Large supervisory control systems such as systems for controlling heating or air conditioning of large buildings may also embody essentially the same two classes of devices, i.e., continuous-valued devices and on-off devices. However, these devices may be great in number, and most of them may be located at great distances from the place where the information is to be assessed. For example, the sensing equipment may be located remotely from the supervisory control equipment which is normally located in the central office. In such systems, the continuous-valued sensors may report at the central office via a value indicator and may also serve to actuate a remote on-off device trip switch. The on-off devices, in turn, may report at the central office via a binary indicator which may be an indicator light representative of whether or not the remote on-off device is in the on state or the off state. It is necessary to calibrate the set-point of the control trip switch of the on-off device which is remote from the central office to adequately insure that the set-point accurately corresponds to the desired control level of temperature or other condition which is being monitored.

One of the most critical problems confronting designers of control equipment has been developing a method to calibrate and adjust the set-point of remote sensing equipment. Heretofore, two methods of calibration have been frequently utilized. In one method, set-point adjustment may be calibrated by utilizing an individual expensive calibrated control device located at the central office for manually adjusting the trip point for the remote on-off device. One drawback of this method is that expensive calibrated equipment must be associated with each remote sensor, and there may be hundreds of remote sensors in a large system. A second drawback is that a mismatch will likely arise between the value scale of the calibrated control device and the value meter used in the central office. This mismatch is registered as an error.

A second method commonly utilized has been to disconnect the sensor in the field and, while in the field, apply a substitute calibration signal which simulates the sensor signal. The magnitude of this calibration signal is measured by a local indicator and thus, with a known calibration signal, the on-off trip point may then be readjusted. This simulated signal is then removed, and the sensor is reconnected. The principal disadvantage of this method is that in order to calibrate a sensor it is necessary to go out into the field and individually remove each sensor unit and then individually calibrate its set-point.

It is important to understand that the trip point calibration of the second method, like the first method, will never match exactly the calibration of the central value indicator. This inaccuracy is primarily due to the fact that the calibration signal is measured by a local indicator which accompanies the service man while, in operation, the sensor signal is monitored by a different indicator located in the central office. Because of the physical differences in the two meters, their readings for an identical signal may not correspond, and a mismatch occurs which will appear in the central office as an error.

SUMMARY OF THE INVENTION

The general purpose of this invention is to provide a method and apparatus for calibrating a sensor instrumentation system which embraces all the advantages of similarly employed methods and possesses none of the aforedescribed limitations. To attain this, the present invention contemplates a method and an apparatus for carrying out this method whereby a remote sensor and its associated set-point may be calibrated within the central office without resorting to a separate calibration unit for each sensor. To accomplish this, the method contemplates the injection of a calibrating signal which is combined with the sensor signal, adjusting the calibrating signal so that the resultant signal at the output at the transducer is equal to a value corresponding to the desired set-point value, adjusting the set-point setting until the control means provides an output signal indicative of equivalence of the set-point and the resultant signal, and then removing the calibrating signal.

It is, therefore, an object of the present invention to provide a unique method and apparatus for remotely calibrating the set-points of a plurality of sensor instruments.

Another object of the present invention is to provide a method and apparatus for calibrating a sensor instrument which does not require the utilization of expensive calibration equipment.

A further object of the present invention is the provision of a method for calibration which allows the calibration to be accomplished in a central office without requiring any work in the field at the point to be sensed.

Still another object of the present invention is to provide a method of calibrating a plurality of set-points for a plurality of sensor instruments which requires the utilization of only a single piece of calibration equipment.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
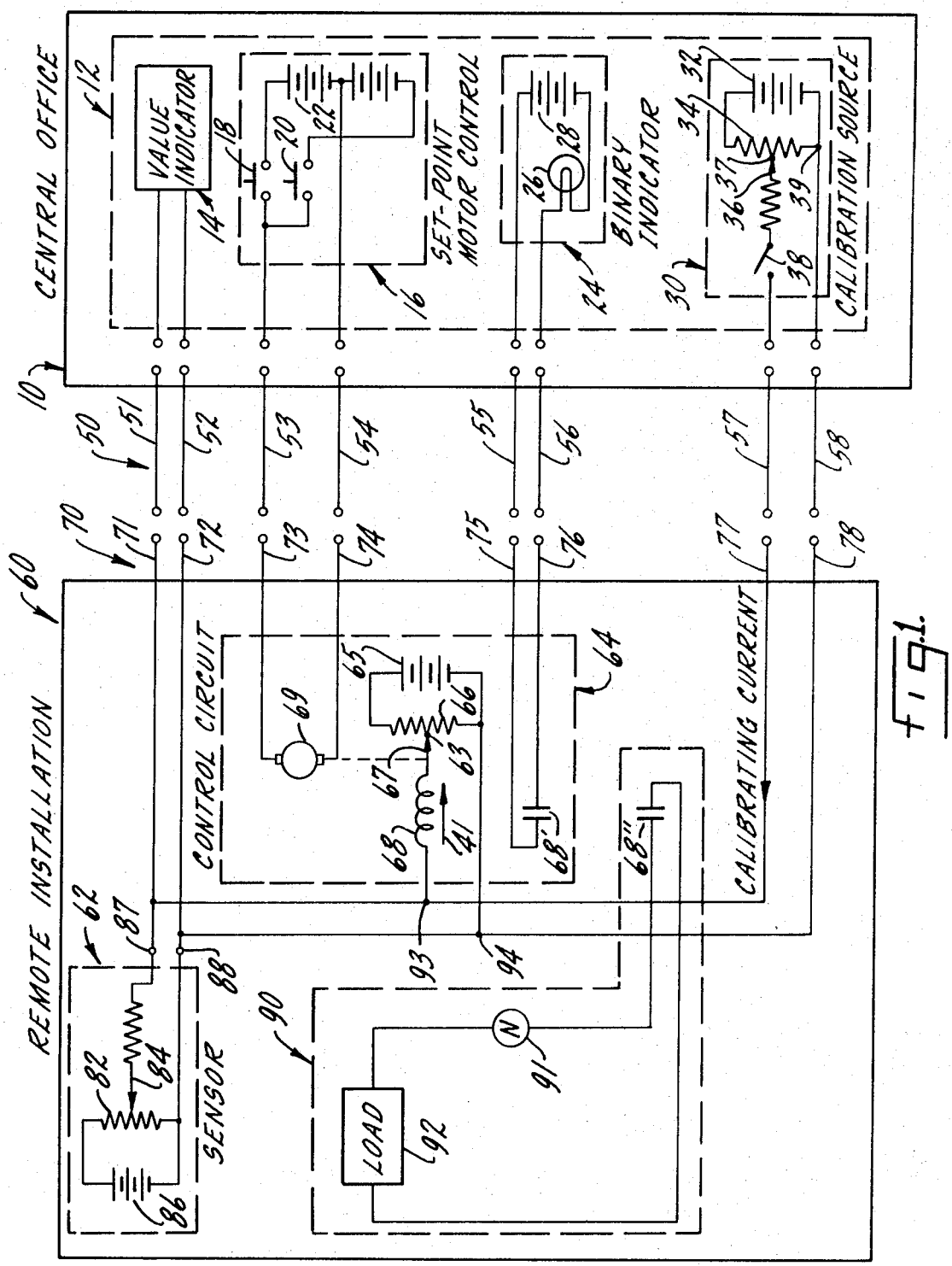
FIG. 1 is a schematic view of a preferred embodiment of the invention.
Figure 2:
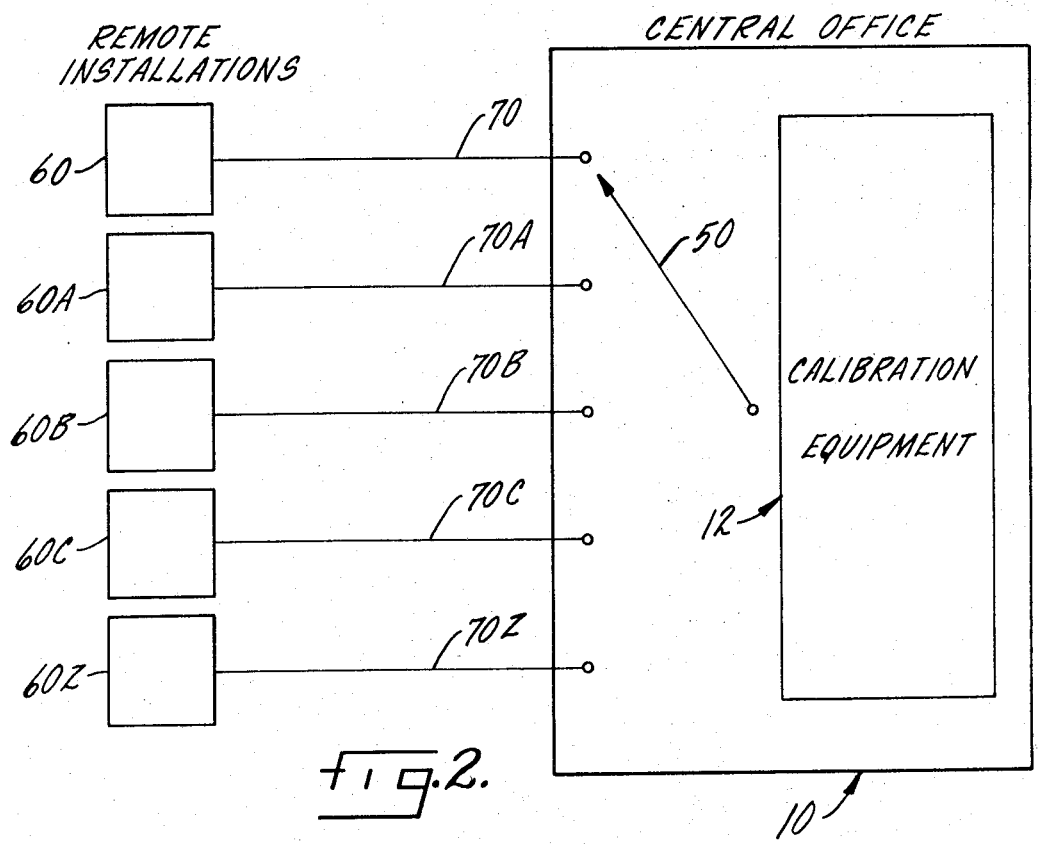
FIG. 2 is a block diagram of the apparatus shown in FIG. 1 when utilized to calibrate several remote sensors.

Referring now to the drawings, FIGS. 1 and 2 illustrate an apparatus for carrying out the steps of the method set forth below. Broadly, the method comprises injecting a calibrating signal which is combined with the sensor signal, adjusting the calibrating signal so that the total or composite signal at the output of the sensor is equal to the value corresponding to the desired set-point, adjusting the set-point setting until the control means provides an output signal indicative of equivalence of the changes from the set-point and the resultant signal, and then removing the calibrating signal.

This method of calibrating a set-point for a sensor or transducer control circuit will be more clearly understood when taken in conjunction with the apparatus for carrying out the method as shown in FIGS. 1 and 2. In order to promote quality of description, the method and apparatus are described herein in application to an on-off control. In this embodiment, the output signal from the control means indicative of equivalence of the set-point and the resultant signal is a binary signal representing a change of the control means from a first state or condition to a second state or condition. It will be apparent to persons skilled in the art that this method is equally applicable to controllers operating in a continuous or nonbinary manner such as proportional controllers, and the like. In such cases, the output signal from the control means indicative of equivalence of the set-point and the resultant signal may be a signal level of predetermined magnitude. Furthermore, it will be recognized that the value of the resultant signal will be equal to the value of the sensor output signal which causes departure from the set-point of the control.

Referring now to the drawings wherein like reference characters designate like or corresponding parts throughout the several views, there is shown in FIG. 1 a central office 10 utilized to monitor and to control a remote installation 60. Remote installation 60 comprises a sensor means 62. Sensor 62 is diagrammatically illustrated as being comprised of a potentiometer 82 having a wiper arm 84 and a voltage source 86. Wiper arm 84 may comprise a bimetallic element whose position varies the output signal proportionately in response to changes in a measured parameter. The sensor 62 may also be a transducer such as a thermocouple or any other convenient sensor. Sensor 62 is used to monitor a given condition, e.g., temperature, and to produce an electrical signal in response to this condition which may be read at the central office 10 by selectively connecting a central office value indicator 14 to the output of the remote sensor 62. A control circuit 64 is electrically connected to sensor 62 and comprises an ON-OFF device which is actuated by the output signal from sensor 62. More specifically, the control circuit 64 comprises a source of voltage 65 and a potentiometer 66 having a wiper arm 67. Connected to the wiper arm 67 is a relay winding 68 which controls two relay contacts 68' and 68". When the relay winding 68 is energized by current flow in the direction indicated by the arrow 41, the contacts 68' and 68" are closed. The contacts 68' and 68" otherwise remain open. The position of wiper arm 67 determines the set-point of the control circuit 64. A motor 69 is connected to the wiper arm 67 and allows the position of the wiper arm to be changed, thereby changing the set-point of the control. Relay winding 68 is electrically connected to one side of the output of sensor 62, while the other terminal of the output of sensor 62 is connected to one side of the DC source 65. In this manner, the output of the sensor 62 is continuously connected to control 64, and the set-point may be varied by remotely changing the position of wiper arm 67. The relay winding 68 is energized to close the contacts 68' and 68" when the sensor 62 output voltage appearing across points 93 and 94 sufficiently exceeds the set-point voltage at point 63 determined by the wiper arm 67 to cause current flow through the winding 68 in the direction indicated by the arrow 41. The on-off state of the remote control circuit 64 may be read at the central office 10 by selectively connecting a central office binary indicator 24 to the relay contact 68'.

A load circuit 90 may optionally be provided at the remote installation. Contact 68" is electrically connected to a source of power 91 and a load 92. When contact 68" is closed, a circuit is completed, allowing current to flow to load 92, thereby energizing the load. In the example above, if this system were utilized in a heating system, the load 92 may represent a heating unit which would be energized whenever contact 68" is closed. It will be understood by one skilled in the art that any suitable load may be utilized and that this load may be connected in any manner so as to influence the variable condition that is being sensed by sensor 62.

All the equipment in remote installation 60, i.e., sensor 62, control circuit 64, and load circuit 90 are all located in a position remote to the central office 10. FIG. 1 shows one such remote installation. Referring to FIG. 2, there are shown several remote installation 60, 60A, 60B, .... to 60Z where Z represents any positive integer. It can be seen that any number of remote installations may be utilized, depending upon the manner of areas to be monitored by the sensing equipment. Remote installation 60 comprises an output 70, shown in FIG. 2. Likewise, each of the other remote installations also have outputs —70A, 70B, 70C, .... 70Z, respectively. A switch diagrammatically shown as numeral 50 is connected to the calibration equipment 12 in central office 10. By using this switch 50, the output of any single remote installation may be selectively connected to the calibration equipment 12.

Referring again to FIG. 1, the output 70 of remote installation 60 is shown in more detail. In essence, there may be eight leads from each remote installation 60. Leads 71 and 72 represent the output leads from sensor 62. Leads 73 and 74 are associated with the motor 69. Leads 75 and 76 connect contact 68' to the central office equipment, while leads 77 and 78 provide a means for introducing calibrating equipment to the output of sensor 62. Likewise, switch 50 may also comprise eight leads to connect the corresponding leads 70 of the remote installation 60 to the leads of the central office 10. It will be understood by one skilled in the art that the diagrammatic representation for the output leads 70 and for switch 50 are for illustrative purposes only and that any suitable multiple contact switching means may be utilized without departing from the scope of the invention. It can be seen that by merely changing the position of switch 50, the calibration equipment 12 may be utilized to calibrate any remote installation directly from the central office 10 without the need of visiting the remote installation itself.

Broadly, the calibration equipment 12 comprises the value indicator 14 which is used to represent the value of the measured parameter being measured by sensor 62 as represented by the electrical output of sensor 62. For example, for every level of the measured parameter sensed by the sensor 62, there is a corresponding level of the voltage output from the sensor 62 which can be transformed into a visual indication by means of a voltmeter or an ammeter. Any suitable value indicator means 14 may be utilized, however. Next, there is a set-point motor control circuit 16 which is utilized to control the motor 69 remotely. The set-point motor control may comprise two switches 18 and 20, connected to a source of voltage 22. By closing the switch 18, for example, the motor 69 will run in a first direction, and by closing switch contact 20, motor 69 will run in a reverse direction. In this manner, the position of wiper arm 67 may remotely be changed, thereby changing the position of the set-point control.

Next, the calibration equipment comprises a binary indicator 24. The binary indicator 24 may be comprised of an indicator light 26, in circuit with a voltage source 28. The purpose of the binary indicator 24 is to determine the condition of the ON-OFF output of control circuit 64. When relay winding 68 of control circuit 64 is energized, contact 68" will be closed, thereby completing a circuit through indicator light and showing that the set-point control is in its "ON" state. When relay winding 68 is unenergized, the contact 68" will be open and the indicator light will be off, thereby showing that the control circuit 64 is in its "OFF" state. It will be recognized by one skilled in the art that the binary indicator 24 may be replaced by a continuous or nonbinary indicator and in this manner the disclosed apparatus may be used to calibrate controllers operating in a nonbinary or continuous manner such as proportional controllers and the like. Lastly, the calibration equipment 12 comprises a calibration source 30. Calibration source 30 is a means for electrically injecting a remotely variable signal into the output of sensor 62 so as to either add or subtract from the output signal of sensor 62. The calibration source 30 may be comprised of a source of voltage 32 connected in circuit with a potentiometer 34 having a wiper arm 36. Wiper arm 36 is connected to a switch 38. When switch 38 is in its closed position, a circuit is completed through the potentiometer 34 and voltage source 32, thereby supplying a calibrating current to the output of sensor 62 through switch contact 57 and 58 of switch 50 and leads 77 and 78 of the remote installation 60. When switch 38 is in its open position, the calibration source is removed from the output of the sensor 62.

The operation of the calibration equipment will now be explained in more detail. Referring to FIG. 1, sensor 62 which is represented as a potentiometer 82 having a wiper arm 84 varies in response to the changes in the measured parameter, thereby producing a voltage at output terminals 87 and 88. This voltage may accurately be measured remotely by value indicator 14. Value indicator 14 is connected through leads 51 and 52 of switch 50 to output leads 71 and 72 of remote installation 60. Similarly, if sensor 62 were a thermocouple producing a voltage output in response to temperature value indicator 14 would be a voltmeter calibrated to read temperature, and for every given voltage output of sensor 62 there would be a corresponding temperature indicated on value indicator 14.

Control circuit 64, as explained above, is shown as a relay winding 68 connected to a potentiometer 66 and a voltage source 65. Wiper arm 67 of potentiometer 66 may be positioned by means of motor 69 so as to vary the set-point voltage at point 63. Contacts 68' and 68'' of relay winding 68 are arranged so that when the voltage across points 93 and 94 is greater than the voltage at point 63, the relay operates, thereby closing contacts 68' and 68''. As explained above, the closing of contact 68' illuminates indicator light 26 showing the "ON" state of control circuit 64. The closing of contact 68'' at this time completes a circuit to the load 92. It will be recognized by one skilled in the art that load circuit 90 is shown for illustrative purposes only and is not involved in the set-point calibration procedure.

In order to calibrate the set-point of control circuit 64, it is necessary to introduce a calibration current to the outputs 87 and 88 of sensor 62. To accomplish this, switch 38 of calibration source 30 is closed, thereby completing an electrical circuit. Potentiometer 34 of calibration source 30 may be adjusted so that the voltage at points 37 and 39 will produce a calibration current which flows to remote installation 60 through contact leads 57 and 58 of switch 50 and leads 77 and 78 of output lead 70 of the remote installation 60. By varying this calibration current, the voltage at points 87 and 88 of sensor 62 and consequently the voltage across points 93 to 94 may be remotely controlled.

The voltage across outputs 87 and 88 of sensor 62 is indicated by value indicator 14 in the central office and constitutes the total or resultant signal generated by combining the sensor 62 output signal with a calibrating signal from the calibration source 30. It is important to note that the value of the calibrating signal introduced by the calibration source 30 need not be known, since the accuracy of the calibration depends only upon the reading of value indicator 14.

It is apparent that the electrical signal at the output of sensor 62 can be set by adjustment of the calibration source 30 to simulate the output for any desired value of the measured variable. Now, by observing the status of binary indicator 24 and by adjusting the value of the calibration signal up and down, one can determine from the value indicator 14 the exact value at which the indicator light 26 turns on. Hence, the binary indicator 24 functions to indicate equivalence of the set-point and resultant signal. Further, since the value indicator 14 and the control circuit 64 are both actuated by the identical input voltage, i.e., the voltage across points 87, 88, and 93, 94, one can be assured that whenever the measured variable reaches a level to produce that same electrical output from sensor 62, the control device will be actuated. The actual set-point is now set by varying the position of potentiometer wiper arm 67. This may be remotely accomplished by utilizing set-point motor control 16 as explained above by alternately actuating contacts 18 and 20, and thus the set-point may be increased or decreased. When the proper value for the set-point as shown on value indicator 14 is reached, indicator light 26 will turn on and off at this point as the control circuit 64 switches from its "ON" state to its "OFF" state, or vice versa. When the calibration source 30 is then removed by opening switch 38, the set-point will be calibrated, and any output of the sensor 62 which equals this set-point will then cause the energization of relay 68.

In summation, the following steps are therefore performed in order to calibrate the set-point of control circuit 64. First, the calibrating signal is injected by the calibration source 30 so as to artificially cause the value indicator 14 to read the precise value at which the control action or set-point of the control circuit 64 is in agreement with the reading on value indicator 14, and the motor operation is stopped. By slight jogging of the motor control, it is possible to set the set-point to within any degree of precision desired. After reaching this point, the calibration source is removed, and the set-point is then solely actuated by the output of sensor 62.

Again, to reiterate, it is important to note that the exact voltage setting of potentiometer 66 is unknown as is the position of the wiper arm 67. They need not be known in this method, since the exact value of the measured variable which causes control actuation has been determined by the indication of value indicator 14 without regard to the actual value of potentiometer 66 or with the position of wiper arm 67. By this means the adjustment of the control set-point to the desired actuation level has been accomplished with a precision limited only by that of a single value indicator 14 located at the central office.

Referring now to FIG. 2, it can be seen that after remote installation 60 has been calibrated, the switch contact 50 may then be moved to output lead 70A and remote installation 60A may be calibrated in a like manner. Therefore, it can be seen that with only one set of calibration equipment 12, numerous remote installations may be calibrated accurately, thereby vastly saving time and cost of calibration. The disclosed apparatus and method for calibration basically requires only a crude signal source to supply a calibration signal and this signal source 30, shown as a battery 32 and potentiometer 34 for representative purposes only, may be any type current or voltage source. This calibration current or voltage is then applied to the output of sensor 62, thereby simulating the condition desired to trip the set-point of control circuit 64. By varying the calibration signal, this desired set-point may be read on the value indicator 14 to any degree of accuracy and the set-point may be varied by moving wiper arm 67 of potentiometer 66, thereby changing the set-point in accordance with the desired value as shown by the value indicator 14. It can be seen that the accuracy of calibration depends only upon the accuracy of the value indicator 14 and requires no knowledge of the amount of calibration current or of the resistance in the calibrating loop.

The economic significance of this method and apparatus becomes apparent when applied to large automation systems. In such systems it is desirable to utilize only a single high-accuracy temperature indicator such as value indicator 14, which may then be time shared with many other sensor locations. By utilizing the disclosed apparatus, it is possible to calibrate numerous remote installations 60, 60A, 60B, etc. by time sharing the single value indicator 14 and also sharing a single binary indicator 24 which indicates the on-off state of the control. By referring to FIG. 1, it can be seen that all equipment in the right half of FIG. 1 and designated as a portion of the central office 10 may be time shared, while all the equipment in the left half is associated with individual areas which are being sensed. Thus, a high degree of calibration may be obtained by utilizing a system which is low in cost to operate and may be operated from a single central location.

It should be understood, of course, that the foregoing disclosure relates to only a preferred embodiment of the invention and that numerous modifications or alterations may be therein without departing from the spirit and the scope of the invention as set forth in the appended claims.

What is claimed is:

1. In a control system comprising a sensor means for providing a signal indicative of a variable condition and a control means operable in response to departure of said condition from a set-point, a method for remotely calibrating said set-point comprising the steps of:
    combining a calibrating signal with said sensor signal to provide a resultant signal at the output terminals of said sensor;
    adjusting said calibrating signal so that said resultant signal is equal to a value corresponding to said desired set-point value;
    adjusting said set-point setting until said control means provides an output signal indicative of equivalence of said set-point and said resultant signal; and
    removing said calibrating signal.

2. The method of claim 1 wherein said calibrating steps are performed remotely from said sensor and said control means.

3. In a control system comprising a plurality of sensor means, each providing a signal indicative of a variable condition and a plurality of control means, each responsive to an associated sensor means and operable at a set-point in response to said condition, a method for remotely individually calibrating each of said set-points comprising the steps of:
    selecting one of said sensor means and its associated control means;
    combining a calibrating signal with said sensor signal of said selected sensor means;
    adjusting the said calibrating signal so that the total signal of said calibrating signal and said sensor signal is equal to a value corresponding to said desired set-point value for said selected control means;
    adjusting said set-point setting until said control means changes from a first state to a second state;
    removing said calibrating signal from said selected sensor means; and
    selecting a second of said sensor means and its associated control means wherein said steps are repeated.

* * * * *

UNITED STATES PATENT OFFICE
CERTIFICATE OF CORRECTION

Patent No. 3,630,437          Dated December 28, 1971

Inventor(s) James R. Swanson

It is certified that error appears in the above-identified patent and that said Letters Patent are hereby corrected as shown below:

Column 3, line 4, " quality " should be --clarity--.

Column 4, line 57, " 68" " should be --68'--.

Column 4, line 58, after " light " the following was omitted:
    --26 and voltage source 28, thereby illuminating the indicator light--.

Column 4, line 60, " 68" " should be --68'--.

Column 6, line 13, after " set-point " the following was omitted:

--is desired. Set-point motor 69 is then energized and controlled by means of set-point motor control 16 so as to cause a change in the state of the indicator light 26, thereby indicating that the control circuit 64 has switched from its "ON" state to its "OFF" state or visa versa. When this occurs, the set-point--.

Signed and sealed this 13th day of June 1972.

(SEAL)
Attest:

EDWARD M. FLETCHER, JR.           ROBERT GOTTSCHALK
Attesting Officer                   Commissioner of Patents